United States Patent
Nakamura et al.

(10) Patent No.: US 6,358,572 B1
(45) Date of Patent: Mar. 19, 2002

(54) METHOD FOR MANUFACTURING A NONLINEAR OPTICAL THIN FILM

(75) Inventors: Naoki Nakamura, Shizuoka-ken; Hiroshi Hasegawa, Shizuoka; Kiyohito Murata; Hideki Nakayama, both of Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/398,314

(22) Filed: Sep. 20, 1999

(30) Foreign Application Priority Data

Sep. 22, 1998 (JP) .......... 10-268126
Jan. 11, 1999 (JP) .......... 11-004750

(51) Int. Cl.⁷ .......... B05D 5/12; B05D 3/06; C23C 14/10; C23C 14/28
(52) U.S. Cl. .......... 427/527; 427/534; 427/567
(58) Field of Search .......... 427/527, 529, 427/567, 532, 533, 563, 534; 204/192.23, 192.26, 192.27, 192.28, 192.29

(56) References Cited

U.S. PATENT DOCUMENTS

| | | | | |
|---|---|---|---|---|
| 4,599,272 A | * | 7/1986 | Ichikawa | 427/527 |
| 5,122,483 A | * | 6/1992 | Sakai et al. | 427/527 |
| 5,436,035 A | * | 7/1995 | Lohwasser | 427/567 |
| 5,462,779 A | * | 10/1995 | Misiano et al. | 427/527 |
| 5,532,063 A | * | 7/1996 | Shindoh et al. | 427/567 |
| 5,597,622 A | * | 1/1997 | Zöet al. | 427/567 |
| 5,618,575 A | * | 4/1997 | Peter | 427/527 |
| 5,744,370 A | * | 4/1998 | Nakamura | 427/527 |
| 5,851,938 A | * | 12/1998 | Nishi et al. | 204/192.23 |

FOREIGN PATENT DOCUMENTS

| | | | | |
|---|---|---|---|---|
| EP | 000293198 | * 11/1988 | | 427/527 |
| EP | 0 978 754 | 2/2000 | | |
| EP | 1 063 557 | 12/2000 | | |
| JP | 06340444 | 12/1994 | | |

OTHER PUBLICATIONS

*CRC Handbook of Chemistry & Physics*, 56ᵗʰ ed. R. West, ed., CRC Press, Cleveland Ohio; excerpt. p. E–66, 1974 No Month.*

Spectroscopy Research, vol. 45, No. 6 (1996–no month), p. 294.*

Material Reasearch Society Symposia Proceedings, vol. 61 (1986–no month), p. 326.*

Physical Review B, vol. 46, No. 18 (1992—no month)), p. 11448.*

Sugihara, O, et al., "Thermally poled silicate thin films with large second–harmonic generation," *J. Opt.Soc.Am B*, vol. 15, No. 1, Jan. 1998.

Takahashi, M., et al. "Defect formation in $GeO_2$–$SiO_2$ glass by poling with ArF laser excitation," *Appl. Phys Lett.*, 71 (8), Aug. 25, 2997.

* cited by examiner

*Primary Examiner*—Marianne Padgett
(74) *Attorney, Agent, or Firm*—Finnegan, Henderson, Farabow, Garrett & Dunner, L.L.P.

(57) ABSTRACT

A method for manufacturing a nonlinear optical thin film of a silica glass system with sufficient nonlinear optical characteristics, in which a glass substrate 12 is disposed within a vacuum deposition chamber 10 and an electron beam is applied to a $SiO_2$—$GeO_2$-system glass placed on a hearth liner 14 to form a $SiO_2$—$GeO_2$-system thin film on the surface of the substrate 12. In an application of this method, ions of argon, for example, are emitted from an ion source to produce dipoles in the deposited $SiO_2$—$GeO_2$-system thin film. By applying an electric field to the $SiO_2$—$GeO_2$-system thin film thus formed, the dipoles are oriented to let the thin film exhibit nonlinear optical characteristics.

5 Claims, 17 Drawing Sheets

METHOD FOR MANUFACTURING A NONLINEAR OPTICAL THIN FILM

BACKGROUND OF THE INVENTION

1. Field of the Invention

The present invention relates to a method for manufacturing a nonlinear optical thin film, and more particularly to a method for manufacturing a nonlinear optical thin film using silica glass.

2. Description of the Related Art

Various kinds of nonlinear optical materials with a light control function have been proposed for applications to optoelectronics. Among those nonlinear optical materials, $LiNbO_3$ (lithium niobate) is a typical example in widespread practical use.

In the case of lithium niobate, however, when used in optical elements, loss arises caused by differences in physical properties, such as refractive index or thermal expansion coefficient, between lithium niobate and glass as a connection member. Therefore, there have been requirements for nonlinear optical materials based on silica glass toreplace lithiumniobate. Such a silica-glass-based nonlinear optical material is disclosed in Japanese Patent Laid-Open Publication No.6-340444, for example.

However, those nonlinear optical materials based on silica glass do not necessarily have sufficient optical characteristics, so that their characteristics need to be improved further for practical use.

SUMMARY OF THE INVENTION

The present invention has been made to solve the above problem and has as its object to provide a method for manufacturing a silica-glass-based nonlinear optical thin film having sufficient nonlinear optical characteristics.

To achieve the above object, according to the present invention, there is provided a method for manufacturing a nonlinear optical thin film, comprising forming a thin film of $SiO_2$—$GeO_2$ system on a substrate by electron beam evaporation while performing ion beam assist and performing poling by applying an electric field to the thin film.

According to an aspect of the invention, the method for manufacturing a nonlinear optical thin film uses any of argon, helium and neon ions for ion-beam assist.

According to another aspect of the invention, the method for manufacturing a nonlinear optical thin film performs poling by applying an electric field simultaneously with electron beam evaporation.

According to an additional aspect of the invention, the method for manufacturing a nonlinear optical thin film uses a target deficient in oxygen in electron beam evaporation.

According to yet another aspect of the invention, the method for manufacturing a nonlinear optical thin film comprises forming a thin film of $SiO_2$—$GeO_2$ system on a substrate by electron beam evaporation while performing ion beam assist and orientation including ion beam assist at lower energy than that in the thin film forming step, wherein the ion-beam radiation facilitates orientation.

DESCRIPTION OF THE PREFERRED EMBODIMENTS

Preferred embodiments of the present invention will be described with reference to the accompanying drawings.

<Embodiment 1>

Figure 1:
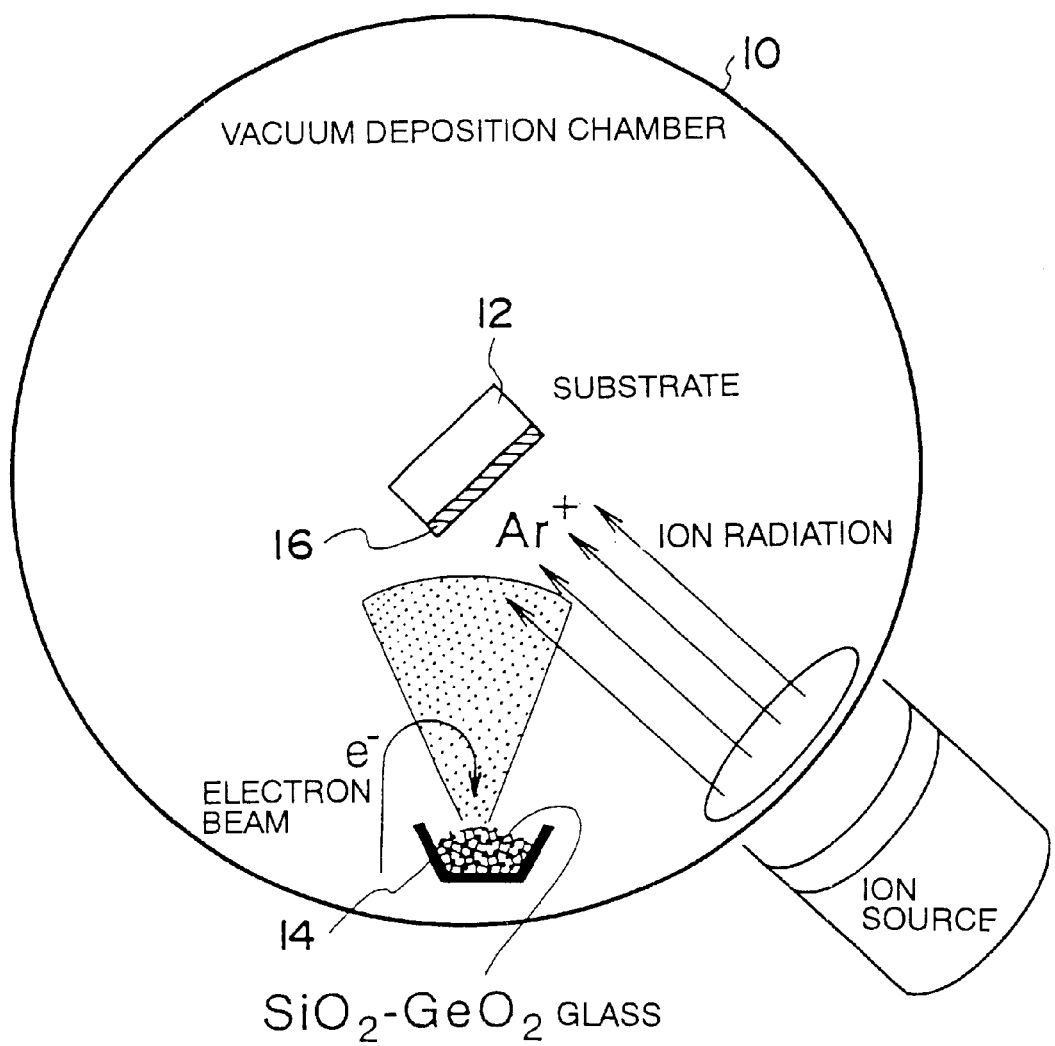
FIG. 1 is a composition diagram of a system for embodying a method of manufacturing a nonlinear optical thin film according to the present invention.

FIG. 1 is a composition example of a system for embodying a method for manufacturing a nonlinear optical thin film according to the present invention. In FIG. 1, a substrate 12 of glass, for example, is located within a vacuum deposition chamber 10. Then, a hearth liner (crucible) 14 holding $SiO_2$—$GeO_2$ glass is disposed, and the $SiO_2$—$GeO_2$ glass is irradiated by an electron beam and evaporates, so that a $SiO_2$—$GeO_2$-system thin film is formed on the surface of the substrate 12 by electron-beam evaporation. To form such a thin film, sputtering or the like may be used besides electron-beam evaporation.

In the $SiO_2$—$GeO_2$ thin film formed on the surface of the substrate 12, dipoles (GeE' centers) as the origins of nonlinear optical characteristics are liable to be produced among the elements Ge. This is why the $SiO_2$—$GeO_2$ thin film exhibits nonlinear optical characteristics. Note that the $GeO_2$ concentration of $SiO_2$—$GeO_2$ used in this first embodiment is 5 to 90 mol %.

Figure 2:
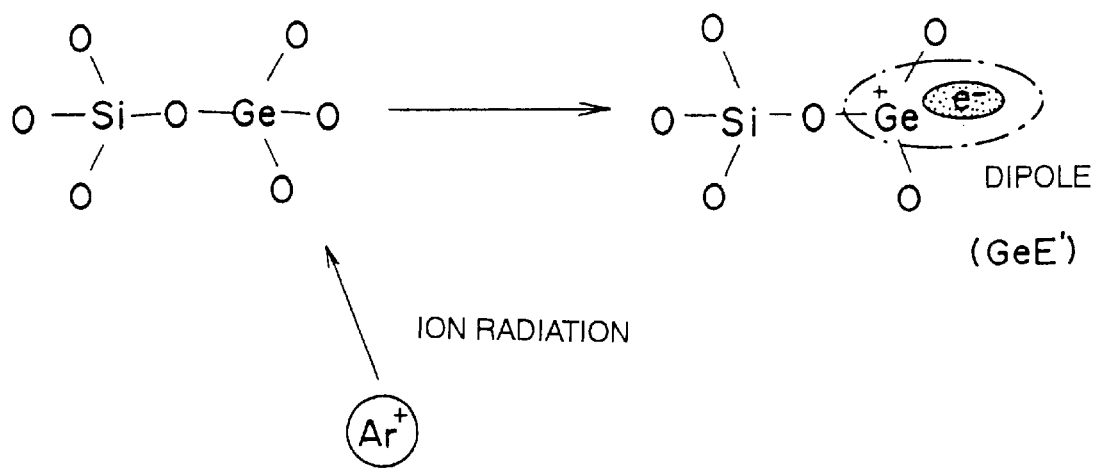
FIG. 2 is an explanatory diagram showing how dipoles are produced while ion beam assist is carried out.

To further increase the nonlinear optical characteristics, as shown in FIG. 1, it is effective to irradiate argon ions ($Ar^+$) from the ion source at an intensity of 100 eV to 1 MeV when forming the $SiO_2$—$GeO_2$-system thin film by electron beam evaporation. As ions to be irradiated, helium (He) ions or neon (Ne) ions or the like in addition to argon ions may be used. FIG. 2 shows the process in which a dipole is formed by ion irradiation. As shown in FIG. 2, when a $SiO_2$—$GeO_2$ film is formed by electron-beam evaporation while argon ion beam assist is carried out, an oxygen atom bonded to the germanium atom is extracted, and thus a dipole is produced. When argon ion irradiation is performed, the number of dipoles produced is greater than without argon ion irradiation, with the result that the nonlinear optical characteristics of the $SiO_2$—$GeO_2$-system thin film can be improved.

Figure 3:
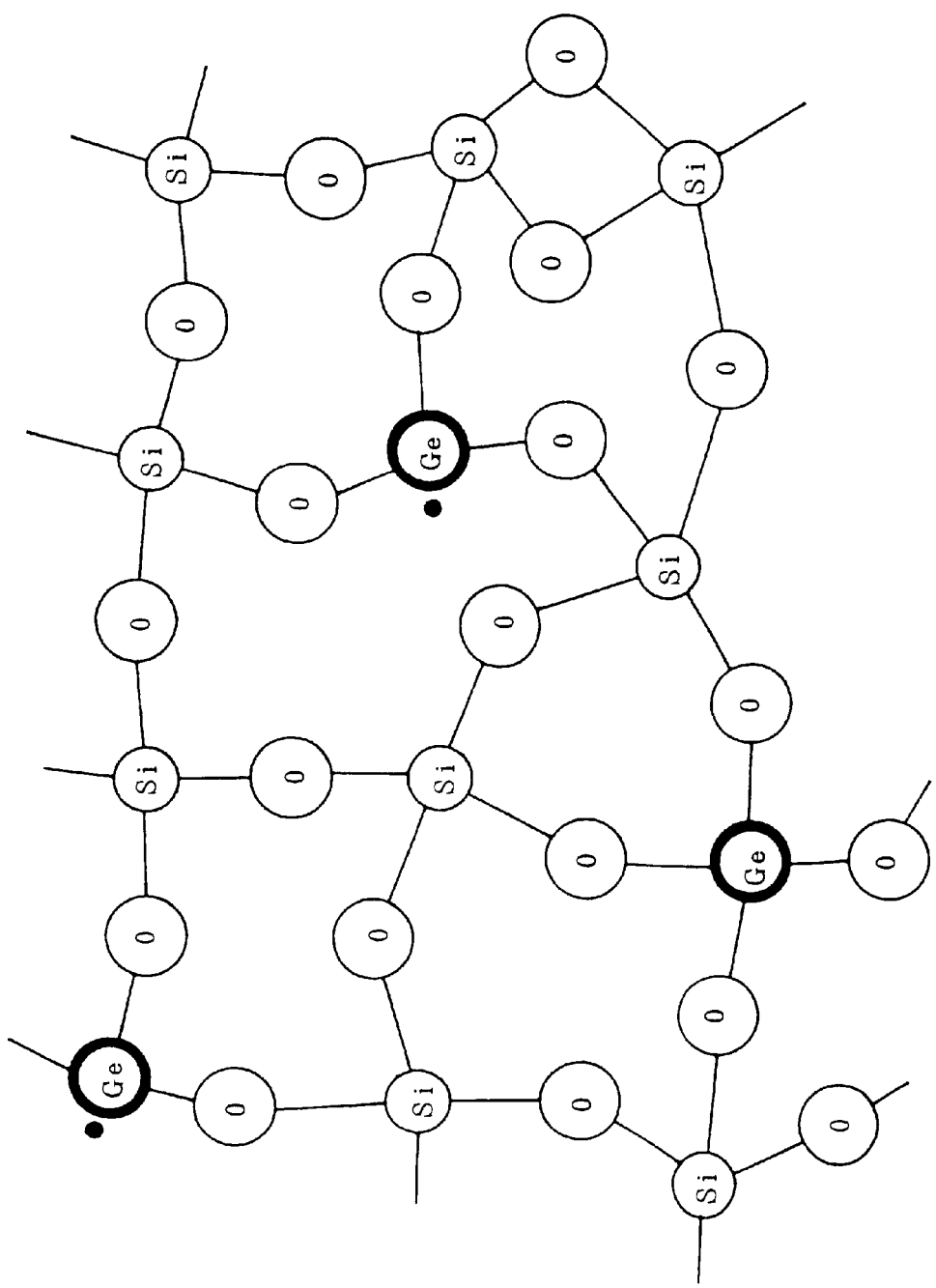
FIG. 3 is a diagram showing the interatomic bond of $SiO_2$—$GeO_2$ formed by the method for manufacturing a nonlinear optical film according to the present invention.

FIG. 3 is a schematic diagram of the atomic bond state of the $SiO_2$—$GeO_2$-system thin film shown in a plan view. FIG. 3 shows that the portions indicated by Ge. are dipoles. The nonlinear optical characteristics originate from the Ge. portions present in the $SiO_2$—$GeO_2$-system thin film.

Figure 4:
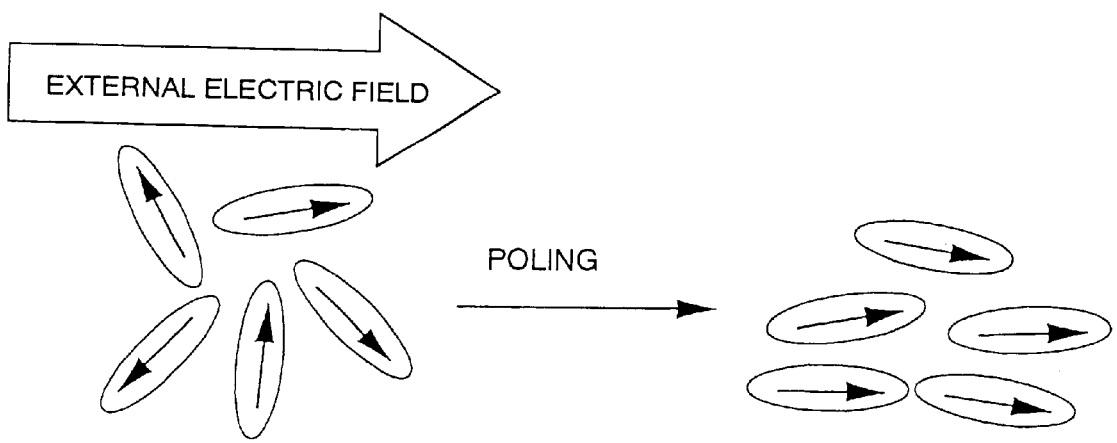
FIG. 4 is an explanatory diagram of the effect of poling.

To cause the $SiO_2$—$GeO_2$-system thin film on the substrate 12 to exhibit the nonlinear optical characteristics, it is necessary to apply an electric field to the deposited thin film and orient the dipoles produced in the thin film as illustrated in FIG. 4. The operation of applying an electric field to the $SiO_2$—$GeO_2$-system thin film is referred to as poling. The intensity of an electric field used in this case ranges from 50 to 200 kV/cm.

When applying an electric field to the $SiO_2$—$GeO_2$-system thin film, electrodes structured as shown in FIGS. 5 to 12 are used. The field-applying electrodes are varied with respect to electrode location, whether or not an insulating film is provided and insulating film thickness, because the thickness or the like of the thin film differs with the usage of the deposited the $SiO_2$—$GeO_2$-system thin film. In those figures, the substrate 12 used is $SiO_2$ glass measuring 40×40×1 mm. On this substrate, a $SiO_2$—$GeO_2$-system thin film 16 is formed by the method mentioned above, and on top of this film, an insulating film 18 of $SiO_2$ is deposited by vacuum deposition if necessary. Ag electrodes 20 for applying an electric field are formed with a thickness of 1 $\mu$m by vacuum deposition.

Figure 5:
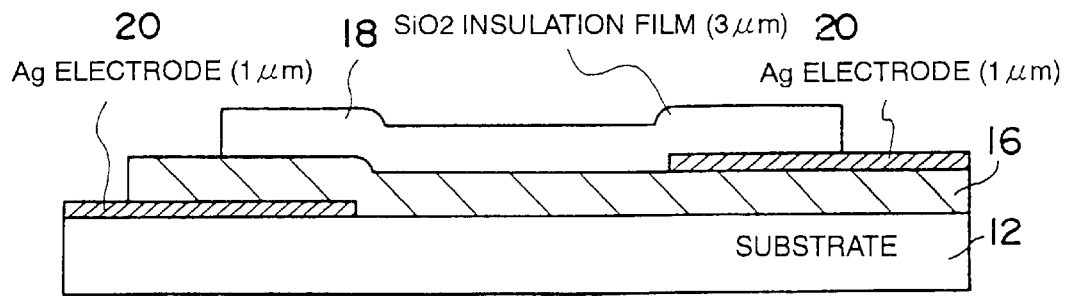
FIG. 5 is a diagram showing an example of an electrode structure for poling in the method of manufacturing a nonlinear optical thin film according to the present invention.

In an example in FIG. 5, the $SiO_2$—$GeO_2$-system thin film 16 is 2 $\mu$m in thickness, on top of which a $SiO_2$ insulating film 18 is formed with a thickness of 3 $\mu$m. This structure is intended to prevent dielectric breakdown while poling is performed with a high field intensity.

Figure 6:
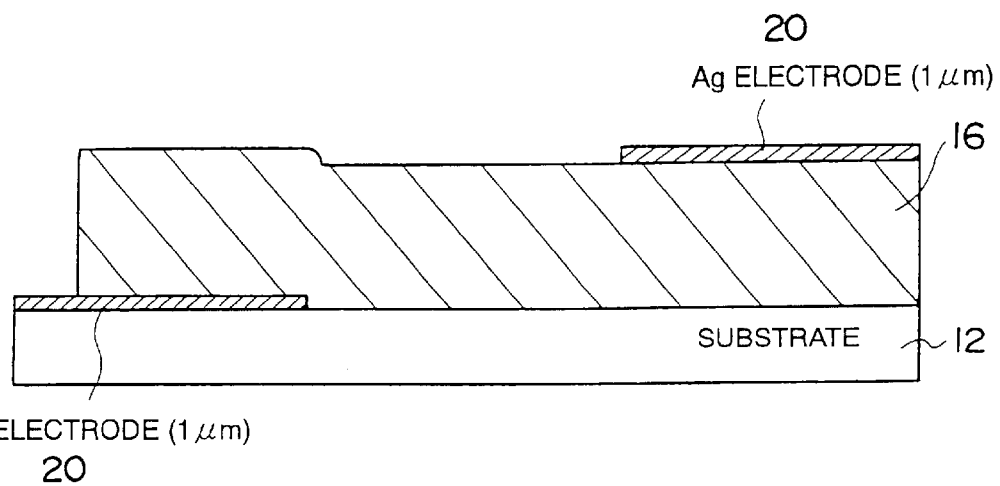
FIG. 6 is a diagram showing an example of an electrode structure for poling in the method of manufacturing a nonlinear optical thin film according to the present invention.

In an example in FIG. 6, a $SiO_2$—$GeO_2$-system thin film 16 with a thickness of 8 $\mu$m is formed on the same $SiO_2$ substrate 12 as in FIG. 5. The Ag electrodes 20 are formed in a similar arrangement to that of FIG. 5. In this example, the $SiO_2$—$GeO_2$-system thin film 16 is formed so thick as 8 $\mu$m that dielectric breakdown is less liable to occur, for which reason the $SiO_2$ insulating film 18 provided in FIG. 5 is omitted here.

Figure 7:
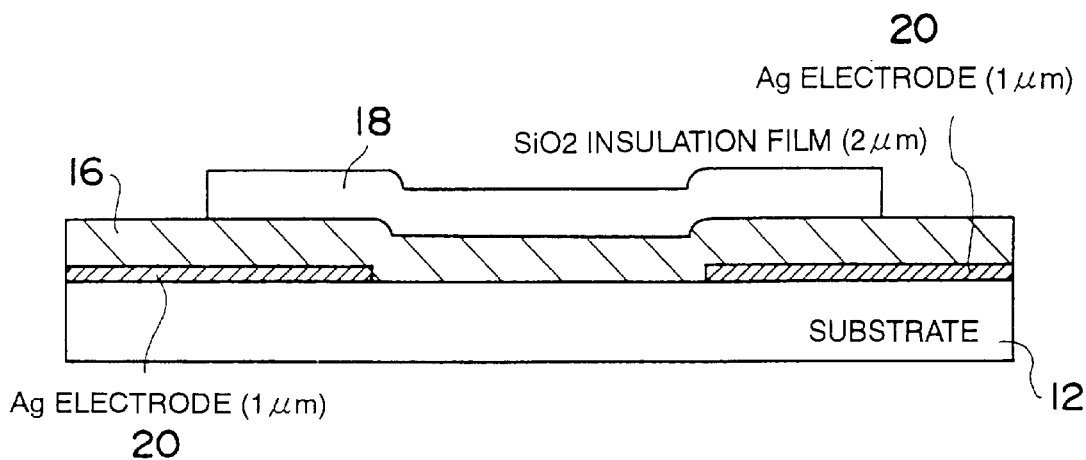
FIG. 7 is a diagram showing an example of an electrode structure for poling in the method of manufacturing a nonlinear optical thin film according to the present invention.

In an example in FIG. 7, the relation among the substrate 12, the $SiO_2$—$GeO_2$-system thin film 16 and the insulating film 18 is the same as in FIG. 5, and the thicknesses of the substrate 12 and the $SiO_2$—$GeO_2$-system thin film 16 are the same as those in FIG. 5. However, in FIG. 7, both Ag electrodes 20 are disposed between the substrate 12 and the $SiO_2$—$GeO_2$-system thin film 16. Therefore, the thickness of the $SiO_2$ insulating film 18 is 2 $\mu$m, thinner by 1 $\mu$m than the 3 $\mu$m in FIG. 5.

Figure 8:
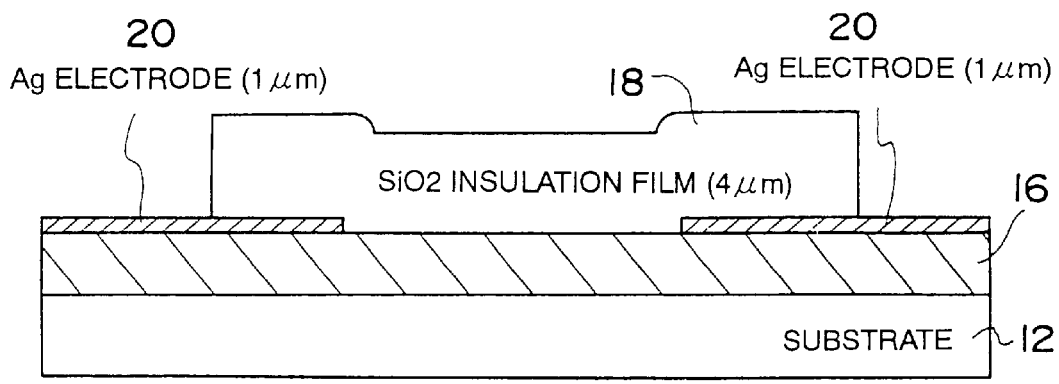
FIG. 8 is a diagram showing an example of an electrode structure for poling in the method of manufacturing a nonlinear optical thin film according to the present invention.

In an example in FIG. 8, contrary to FIG. 7, both Ag electrodes 20 are disposed between the $SiO_2$ insulating film 18 and the $SiO_2$—$GeO_2$-system thin film 16. As a result, the $SiO_2$ insulating film 18 to prevent dielectric breakdown is as thick as 4 $\mu$m.

Figure 9:
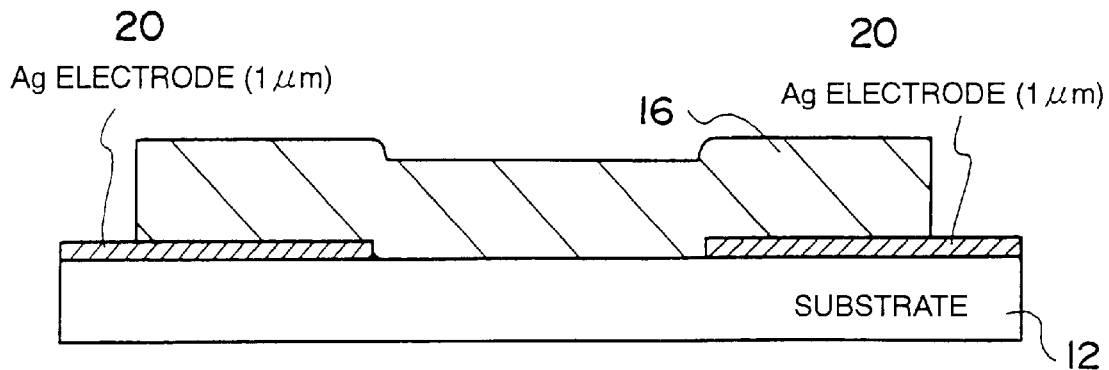
FIG. 9 is a diagram showing an example of an electrode structure for poling in the method of manufacturing a nonlinear optical thin film according to the present invention.

In an example in FIG. 9, like in FIG. 7, the Ag electrodes 20 are disposed between the $SiO_2$—$GeO_2$-system thin film 16 and the substrate 12. In this case, as dielectric breakdown preventive measures, the $SiO_2$—$GeO_2$-system thin film 16 is formed with a large thickness of 4 $\mu$m, thereby obviating the need to provide the $SiO_2$ insulating film 18.

Figure 10:
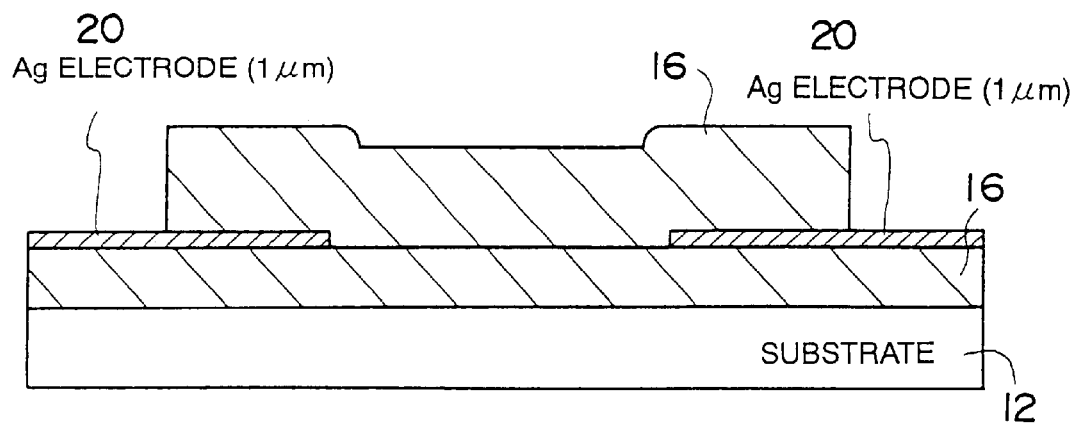
FIG. 10 is a diagram showing an example of an electrode structure for poling in the method of manufacturing a nonlinear optical thin film according to the present invention.

In an example in FIG. 10, like in FIG. 8, the Ag electrodes 20 are placed on the $SiO_2$—$GeO_2$-system thin film 16. A difference from FIG. 8 is that in place of the $SiO_2$ thin film insulating film 18 for dielectric breakdown prevention, another $SiO_2$—$GeO_2$-system thin film 16 is formed on top of the Ag electrodes 20. In this case, the $SiO_2$—$GeO_2$-system thin film 16 on the substrate 12 is 2 $\mu$m thick and the other $SiO_2$—$GeO_2$-system thin film 16 on the Ag electrodes 20 is 4 $\mu$m thick.

Figure 11:
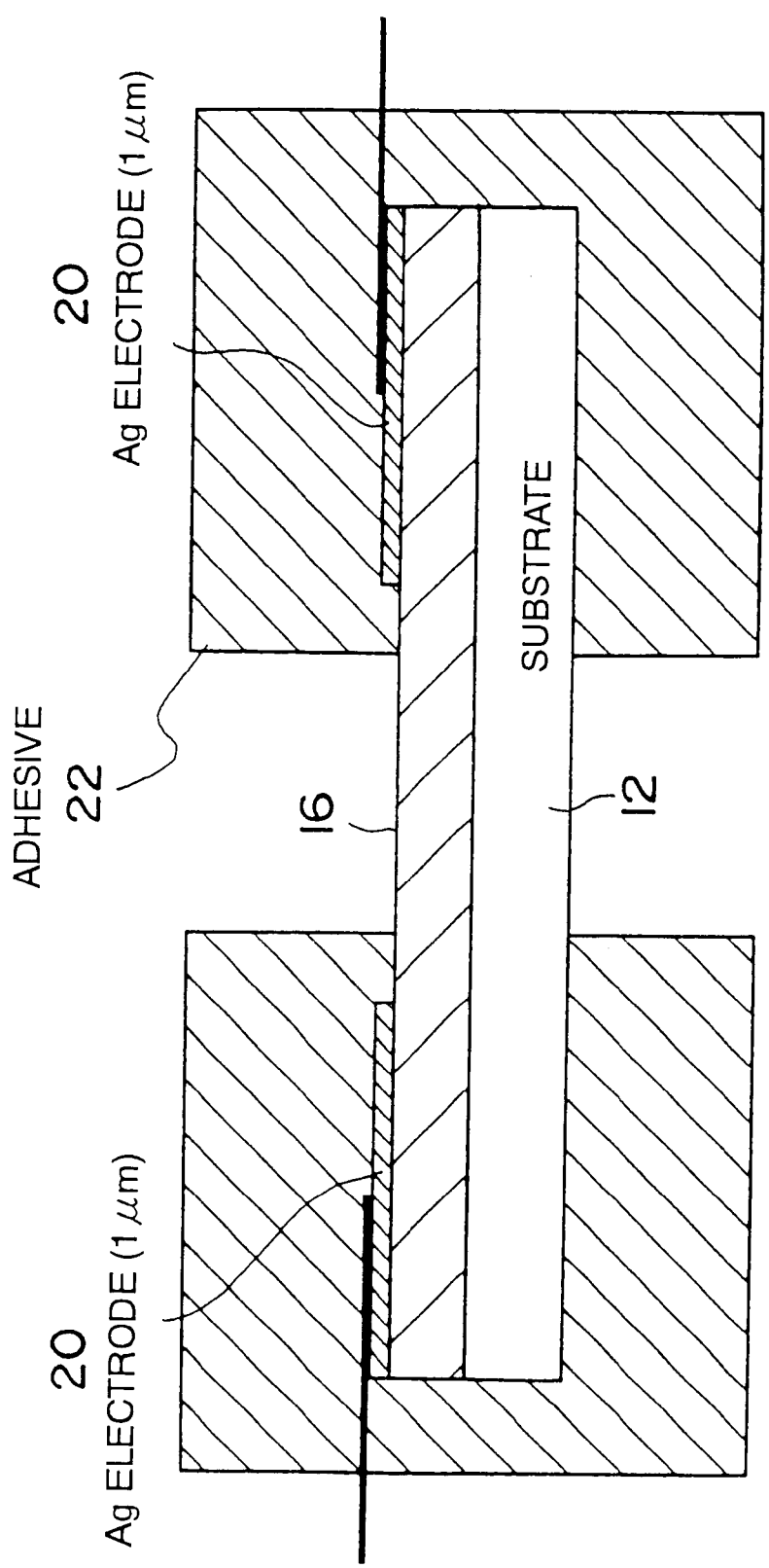
FIG. 11 is a diagram showing an example of an electrode structure for poling in the method of manufacturing a nonlinear optical thin film according to the present invention.

In an example in FIG. 11, like in FIG. 10, the Ag electrodes 20 are formed on the $SiO_2$—$GeO_2$-system thin film 16 and the Ag electrodes 20 are covered with an adhesive 22, such as Araldite. Thus, in this example, the adhesive 22 is used to prevent dielectric breakdown.

Figure 12:
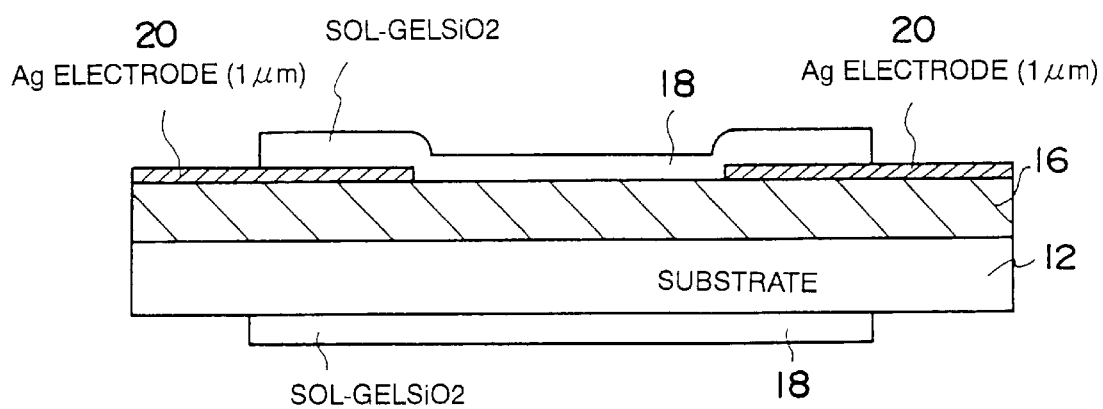
FIG. 12 is a diagram showing an example of an electrode structure for poling in the method of manufacturing a nonlinear optical thin film according to the present invention.

In an example shown in FIG. 12, like in FIG. 10, the Ag electrodes 20 are formed on the $SiO_2$—$GeO_2$-system thin film 16, but a $SiO_2$ film formed by a sol-gel method is used as the insulating film to prevent dielectric breakdown. Meanwhile, because the $SiO_2$ film made by the sol-gel method has undergone a dip process, the underside of the substrate 12 is also covered with a $SiO_2$ film.

Figure 13:
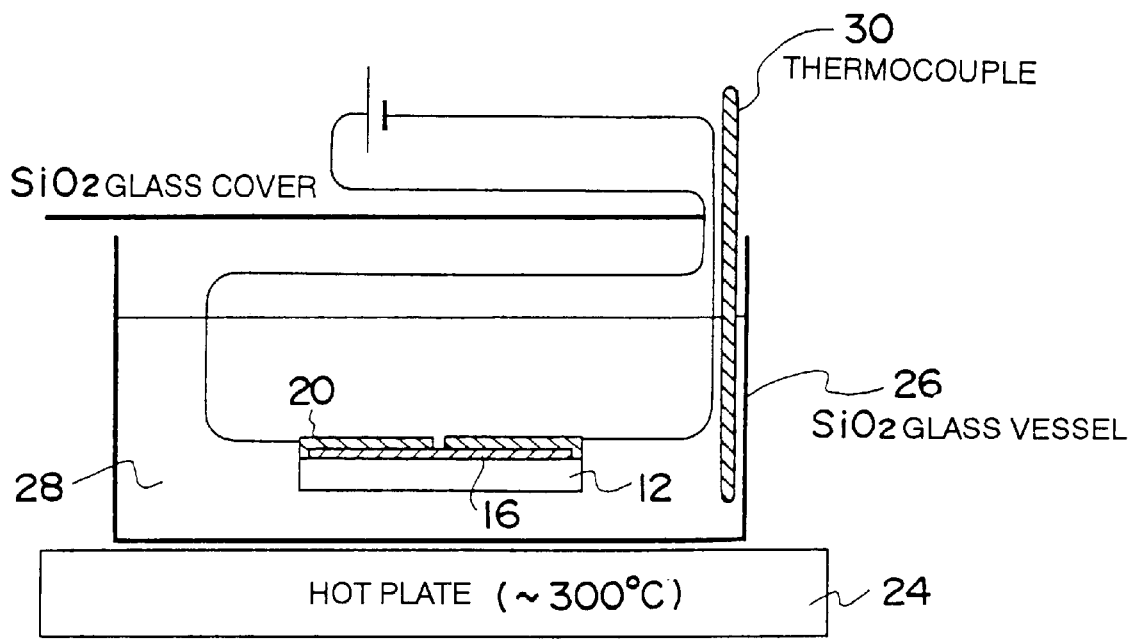
FIG. 13 is a diagram showing an example of a system for poling in the method of manufacturing a nonlinear optical thin film according to the present invention.

The $SiO_2$—$GeO_2$-system thin film 16 with electrodes, formed as described, and the substrate 12 are subjected to poling by poling equipment shown in FIG. 13. In FIG. 13, Flourinert 28, which is an inactive insulating oil, is poured into a glass vessel 26 placed on a hot plate 24. The Flourinert 28 has a boiling temperature of 215° C. and a dielectric strength of 200 kV/cm. The $SiO_2$—$GeO_2$-system thin film 16, mounted on the substrate 12 and including electrodes 20 is dipped in the Flourinert 28, and is acted on by an electric field with a predetermined intensity when a voltage is applied across the Ag electrodes 20. Thus, the dipoles in the $SiO_2$—$GeO_2$-system thin film 16 are oriented. The Flourinert 28 is heated by the hot plate 24 and its temperature is measured with a thermocouple 30.

Figure 14:
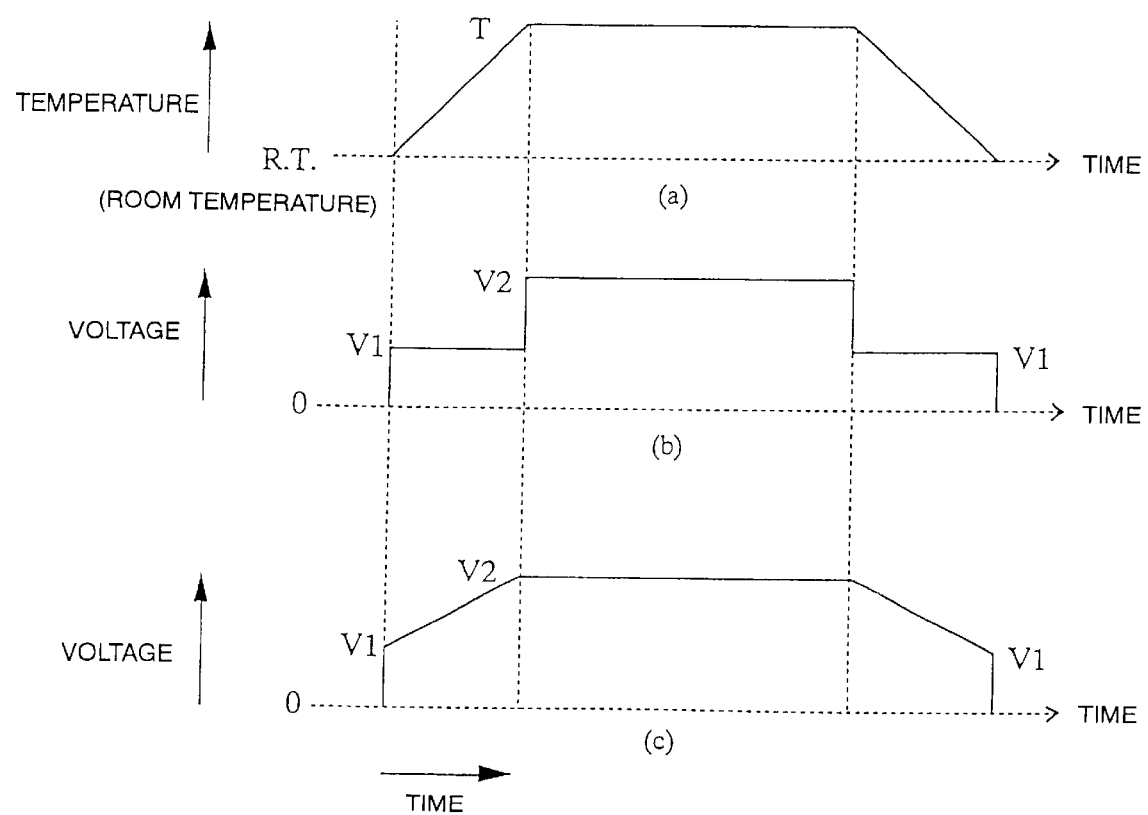
FIG. 14 is a diagram showing changes in the temperature and the applied voltage in poling in the system shown in FIG. 13.

FIGS. 14(a), 14(b) and 14(c) jointly show the relation between the temperatures of the Flourinert 28 and the field intensity applied to the $SiO_2$—$GeO_2$-system thin film 16 when poling is performed in the poling equipment shown in FIG. 13. FIG. 14(*a*) shows temperature changes of the Flourinert 28 during poling. In this case, the Flourinert temperature is changed as follows. The Flourinert temperature is gradually raised from room temperature, and when a predetermined poling temperature is reached, the temperature is held constant for a specified time and is gradually decreased to room temperature.

FIG. 14(*b*) shows a pattern of changing the intensity of an electric field applied to the $SiO_2$—$GeO_2$-system thin film 16 in accordance with temperature changes shown in FIG. 14(*a*). When poling is performed using the pattern of FIG. 14(*b*), a poling temperature of 200° C. is adopted. For a period of time from when the temperature rises from room temperature until it reaches the poling temperature of 200° C., the field intensity is held constant at V1 (50 kV/cm), and when the poling temperature is reached, the field intensity is raised to V2 (100 kv/cm). The field intensity is held constant at V2 for the same specified time as that in FIG. 14(*a*). After this, the field intensity is again lowered to V1 and the Flourinert temperature is gradually decreased. The reason why the field intensity is held at a low value while the temperature is low is that if a high field intensity is applied at low temperatures, dielectric breakdown is likely to occur.

In FIG. 14(*c*), a poling temperature of 250° C. is adopted, the field intensity V1 at the first stage is 70 kV/cm and the field intensity V2 at the second stage is 120 kV/cm. At the stage where the temperature of the Flourinert 28 is raised, the field intensity is continuously raised by degrees from V1 to V2. After this, while the Flourinert temperature is held at the poling temperature, the field intensity is also held at V2. After the lapse of a specified time, the field intensity is decreased continuously from V2 to V1 in step with decreasing temperature.

In other words, while the temperature is low, because dielectric breakdown is likely to occur, the field intensity is held at a relatively low level, and when the temperature of the Flourinert 28 reaches the target poling temperature, a higher field intensity is set. With this arrangement, a high field intensity can be applied without incurring dielectric breakdown, so that the dipoles can be oriented appropriately. Thus, the $SiO_2$—$GeO_2$-system thin film 16 can be made to exhibit sufficiently nonlinear characteristics. In the stage where the temperature of the Flourinert 28 is decreased, a specified field intensity is still applied without reducing to zero. This facilitates the orientation of the dipoles to thereby improve the nonlinear optical characteristics.

Figure 15:
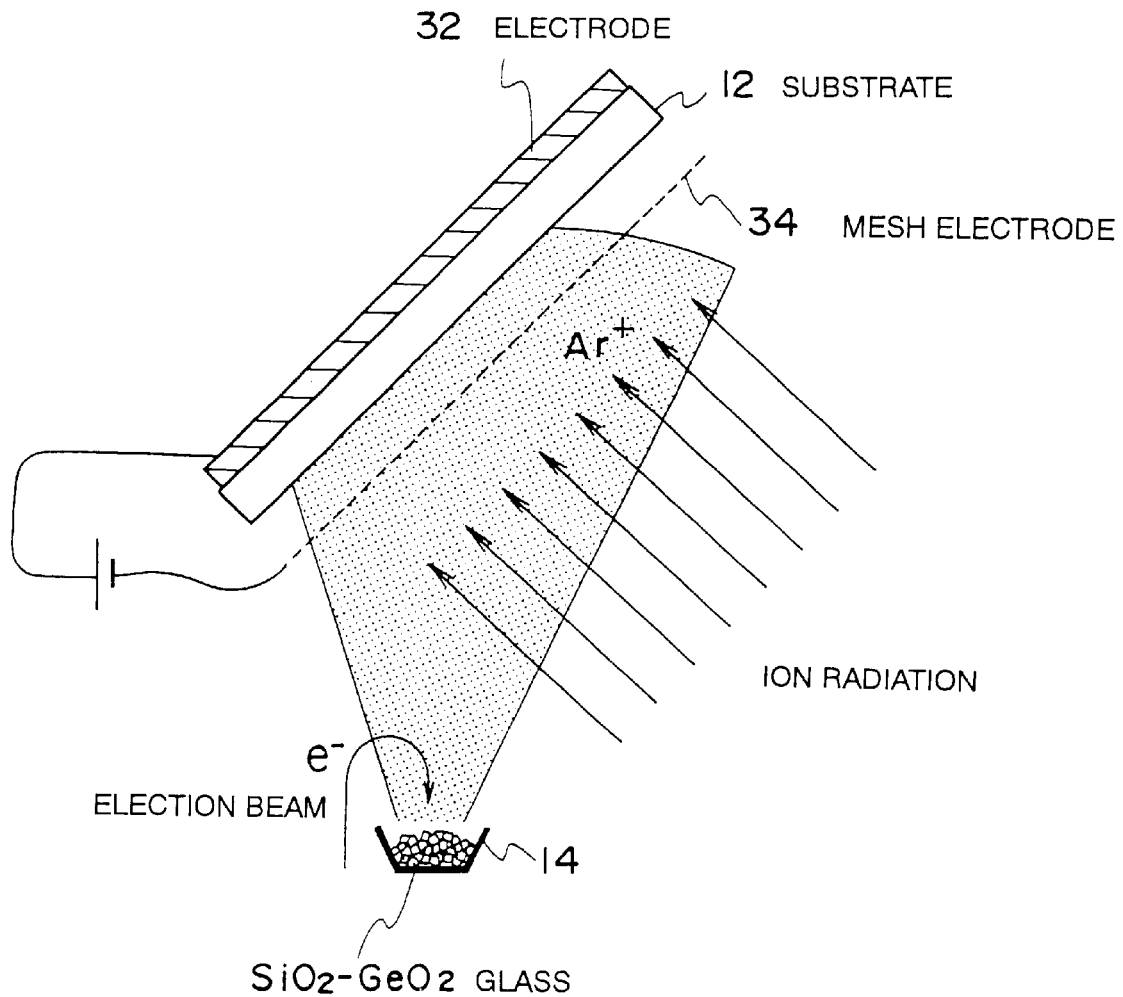
FIG. 15 is a diagram showing an example of simultaneous execution of forming a thin film of $SiO_2$—$GeO_2$ system and poling in a modified embodiment of the method for manufacturing a nonlinear optical thin film according to the present invention.
Figure 16:
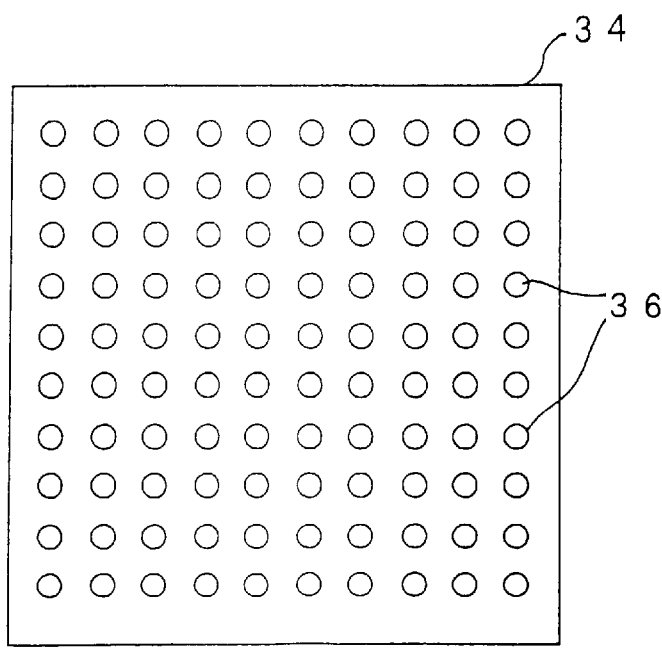
FIG. 16 is a plan view of a mesh electrode used in FIG. 15.

FIG. 15 shows a modification of the method for manufacturing a nonlinear optical thin film according to the present invention. By the method in FIG. 15, poling is performed simultaneously with forming the $SiO_2$—$GeO_2$-system thin film 16 on the substrate 12. More specifically, an electrode 32 for poling is formed on the reverse side of the substrate 12 and a mesh electrode 34 is arranged in front of the side of the substrate 12 where the $SiO_2$—$GeO_2$-system thin film 16 is deposited by electron beam evaporation. FIG. 16 is a plan view of the mesh electrode 34. As illustrated in FIG. 16, the mesh electrode 34 has formed therein a specified number of holes 36 to pass therethrough $SiO_2$—$GeO_2$ molecules to be deposited by electron beam evaporation and $Ar^+$ ions for ion radiation.

In this configuration, while a $SiO_2$—$GeO_2$-system thin film 16 is formed on the surface of the substrate 12 by electron beam evaporation while assisted by ion beam assist by argon ions, a voltage is applied across the electrode 32 and the mesh electrode 34 and an electric field is produced. This electric field orients the dipoles existing in the $SiO_2$—$GeO_2$-system thin film 16. Thus, the dipoles can be produced and oriented efficiently, so that a $SiO_2$—$GeO_2$-system thin film 16 with nonlinear optical characteristics can be obtained.

Figure 17:
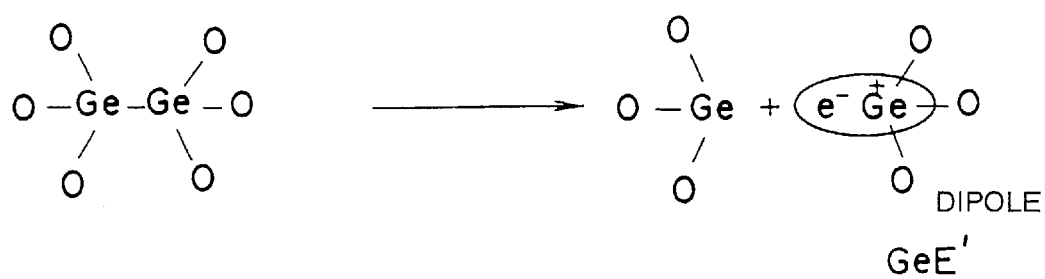
FIG. 17 is an explanatory diagram showing the principle of generation of dipoles when an oxygen-deficient target is used.

FIG. 17 shows the principle of a modification of the method for manufacturing a nonlinear optical thin film according to the present invention. In this embodiment, an oxygen-deficient material is used for the $SiO_2$—$GeO_2$-system glass to be irradiated with an electron beam to produce the $SiO_2$—$GeO_2$-system thin film 16. This method makes it possible to increase the quantity of produced dipoles origins of the nonlinear optical characteristics. The reason is as follows. When an oxygen-deficient material is used, the oxygen deficiency grows in the $SiO_2$—$GeO_2$-system thin film, thus yielding a probability of existence of an $O_3$—Ge—Ge—$O_3$ bond as an origin of a dipole, that is, a GeE' center, and increasing the dipole density. The $O_3$—Ge—Ge—$O_3$ bond shown in FIG. 17 tends to have the Ge—Ge bond broken by ultraviolet rays or ions and the Ge atoms are liable to be changed into dipoles (GeE' centers).

Figure 18:
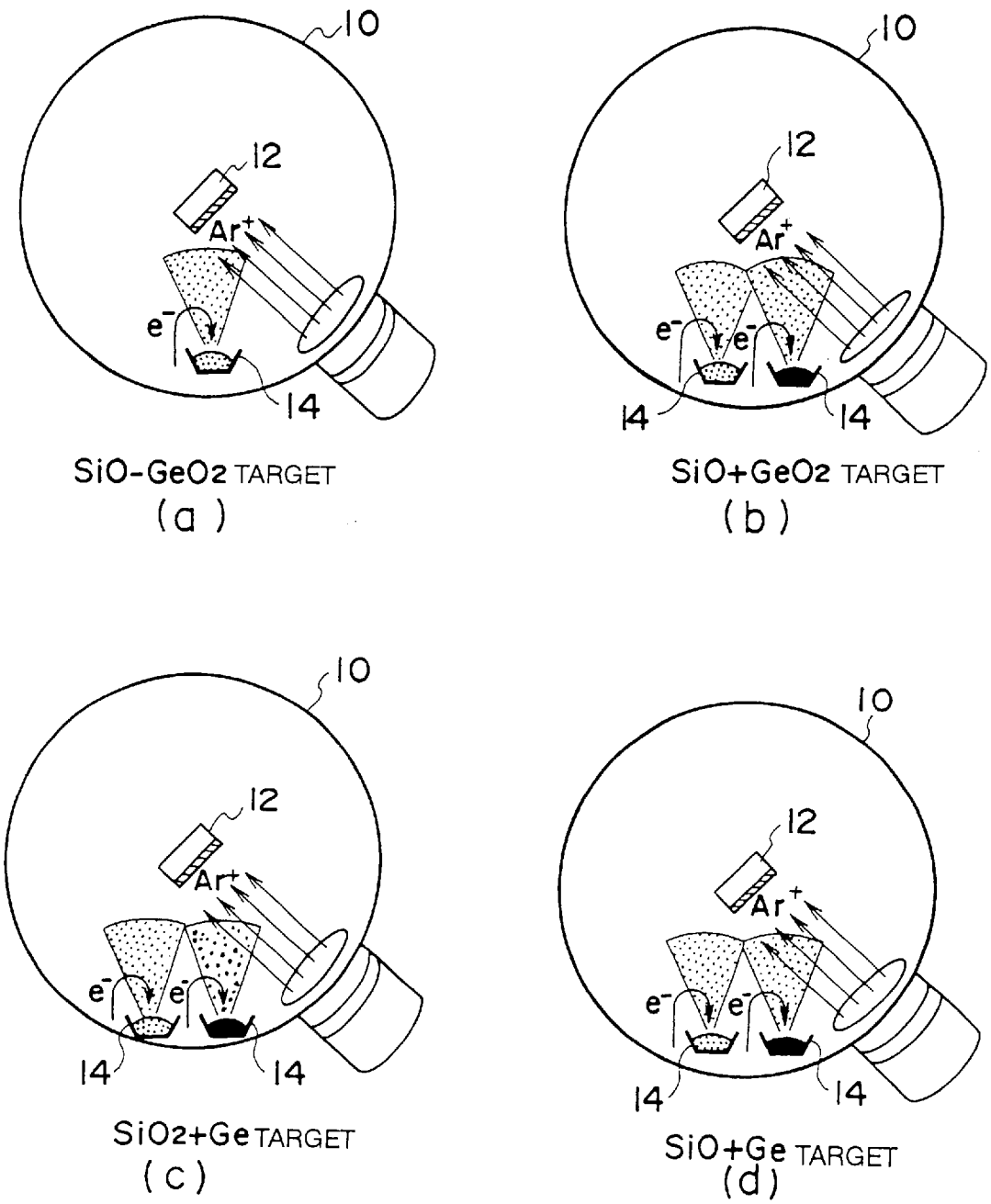
FIGS. 18a, 18b, 18c and 18d are diagrams showing examples of oxygen-deficient targets used in other modifications of the method of manufacturing a nonlinear optical thin film according to the present invention.

FIGS. 18(*a*) to 18(*d*) show examples of oxygen-deficient materials used as targets for electron beam evaporation. In FIG. 18(*a*), one hearth liner 14 is provided to hold SiO—$GeO_2$ and is used as a target. In FIG. 18(*b*), two hearth liners 14 are provided, one to hold SiO and the other to hold $GeO_2$, and are respectively used as targets of electron radiation. In FIG. 18(*c*) also, two hearth liners 14 are provided to hold $SiO_2$ and Ge respectively and are used as targets of electron radiation. In FIG. 18(*d*), too, two hearth liners 14 are provided to hold SiO and Ge respectively and are used as targets of electron radiation.

The above-mentioned SiO, $SiO_2$, Ge and $GeO_2$ may be in a granular or tablet or any other form and may be used independently of each other, or oxygen-deficient tablets of those materials that have been hot-pressed may be used.

Figure 19:
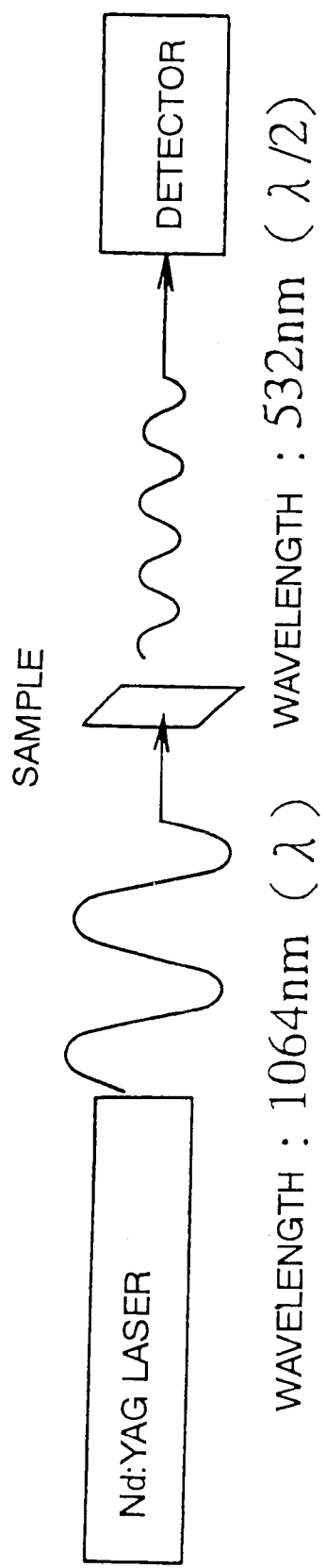
FIG. 19 is an explanatory diagram of a method of measuring nonlinear optical characteristics of a nonlinear optical thin film according to the present invention.
Figure 20:
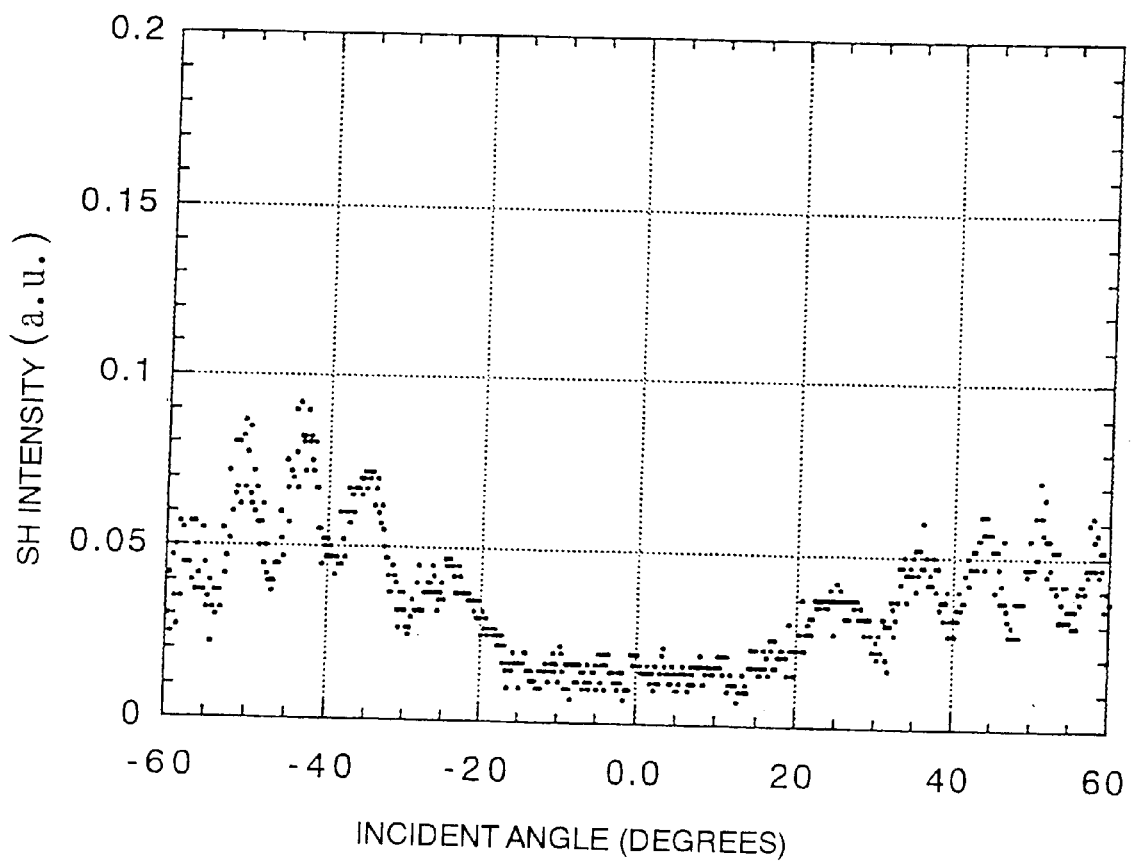
FIG. 20 is a diagram showing measured results by the method shown in FIG. 19.

The nonlinear optical characteristics of a $SiO_2$—$GeO_2$-system thin film thus formed are measured with equipment as illustrated in FIG. 19. In FIG. 19, a sample of a $SiO_2$—$GeO_2$-system thin film, manufactured by the method for manufacturing a nonlinear optical thin film according to the present invention, is irradiated by a laser beam from a Nd:YAG laser, and a wavelength of light coming from the sample is detected by a detector. The wavelength of the laser beam is 1064 nm, and if the sample has nonlinear optical characteristics, a second harmonic generation (SHG), in other words, light having a wavelength which is ½ of the wavelength of the laser beam, is produced. Therefore, in this case, the detector measures a wavelength of 532 nm. The measurement results are shown in FIG. 20. In FIG. 20, the horizontal axis indicates incident angles of the laser beam and the vertical axis indicates the intensities of second harmonic waves. As is obvious from FIG. 20, when the sample is a $SiO_2$—$GeO_2$-system thin film manufactured by the manufacturing method of a nonlinear optical thin film according to the present invention, the second harmonic waves can be recognized which correspond to the incident angles of the laser beam and it has been clarified that the $SiO_2$—$GeO_2$ system thin film used as the sample have nonlinear optical characteristics.

As has been described, according to the method for manufacturing a nonlinear optical thin film according to the present invention, substances, such as glass (a glass of $SiO_2$—$GeO_2$ system) without nonlinear optical characteristics, can be made to exhibit nonlinear optical characteristics. Hence, nonlinear optical thin films can be formed from glass materials as excellent optical transmission materials. It therefore follows that a nonlinear optical thin film can be formed of the same material as with the core of an optical fiber for transmission, so that loss due to differences in physical properties, such as refractive index and thermal expansion coefficient, can be reduced. In addition, being low in optical transmission loss and dielectric constant and excellent in formability, a $SiO_2$—$GeO_2$-system glass can be used to realize optical integrated circuits capable of high-speed operations with reduced loss.

Table 1 shows the evaluation results of characteristics of the $SiO_2$—$GeO_2$-system thin film according to the present invention compared with those of a ferrodielectric ($LiNbO_3$) and an organic material (MNA: 2-methyl-4-nitroaniline), which have been used as nonlinear thin films.

When a $SiO_2$—$GeO_2$-system thin film 16 is electron-beam-deposited on a substrate 12 in this manner, this deposition process is assisted by ion beam assist, in which argon ions ($Ar^+$) are applied. The injected energy of argon ions in this case ranges from 1 keV to 1 MeV. As ions for use in ion beam assist, ions of inert gases such as helium (He) and neon (Ne) may be used in addition to argon. Those steps mentioned above constitute the thin film formation process according to the present invention.

When the ion beam assist by argon ions is employed during vapor deposition of a $SiO_2$—$GeO_2$-system thin film 16, the argon ions collide with the molecules of $SiO_2$—$GeO_2$, thereby forming dipoles (GeE' centers) as the generator of nonlinearity. In this process, if the substrate 12 is

TABLE 1

| | Nonlinear optical characteristics | Optical transmission loss | Dielectric constant | Refractive index | Thermal expansion coefficient | Connectability with optical fiber | Connectability with optical fiber | Stability |
|---|---|---|---|---|---|---|---|---|
| Ferrodielectric $LiNbO3$ | ○ $d_{33} = 34$ $d_{31} = 5.9$ $d_{22} = 4.0$ (pm/V) | ○ 0.2 dB/cm | ○ $\epsilon_1 = 78$ $\epsilon_3 = 32$ | ○ $n_o = 2.286$ $n_e = 2.200$ | Δ $2 \times 10^{-4}$ | Δ Different material | ○ | ○ Photo-deterioration Laser breakdown threshold 0.1 GW/cm$^2$ |
| Glass $SiO2$-$GeO2$ | ○ $d_{33} = 3.4$ $d_{31} = 1.1$ | ⊙ $1.5 \times 10^{-6}$ dB/cm | ⊙ 3.8 | ⊙ 1.48 | ⊙ $5.5 \times 10^{-7}$ | ⊙ Same material | ○ | ○ |
| Organic material MNA | ⊙ $d_{11} = 240$ $d_{12} = 34$ | Δ 2 dB/cm | (⊙) 2~6 in almost all polymeric materials | ○ $n_x = 1.6283$ $n_y = 1.6815$ $n_z = 1.7168$ | (○) $10^{-5}$ level in almost all polymeric materials | Δ Different material | Δ Inferior in mechanical strength | Δ Photo-deterioration Heat deterioration Laser breakdown threshold 2 GW/cm$^2$ |

⊙ Excellent
○ Good
Δ Some problem

As shown in Table 1, the $SiO_2$—$GeO_2$-system thin film according to the present invention is equivalent to commercially available $LiNbO_3$ in nonlinear optical characteristics, but is superior to $LiNbO_3$ and NMA in other characteristics. Above all, being a glass material, the $SiO_2$—$GeO_2$-system thin film has no difference in physical properties from optical fiber, which is made of a glass material, and is excellent in connectability with optical fiber.

As has been described, according to this embodiment, a $SiO_2$—$GeO_2$-system glass, provided as the target, is deposited on a substrate by electron beam evaporation. Because the deposition process is assisted by ion beam assist, dipoles are produced in the deposited $SiO_2$—$GeO_2$-system thin film. By orienting the dipoles by poling, the deposited thin film can be made into a nonlinear optical thin film with nonlinear optical characteristics.

If electron beam evaporation and poling are carried out simultaneously, the dipoles formed in the $SiO_2$—$GeO_2$-system thin film can be oriented efficiently.

By using an oxygen-deficient target as the target of electron beam evaporation, the dipoles in the $SiO_2$—$GeO_2$-system thin film can be formed more easily, thereby improving the nonlinear optical characteristics of the film.

<Embodiment 2>

Figure 21:
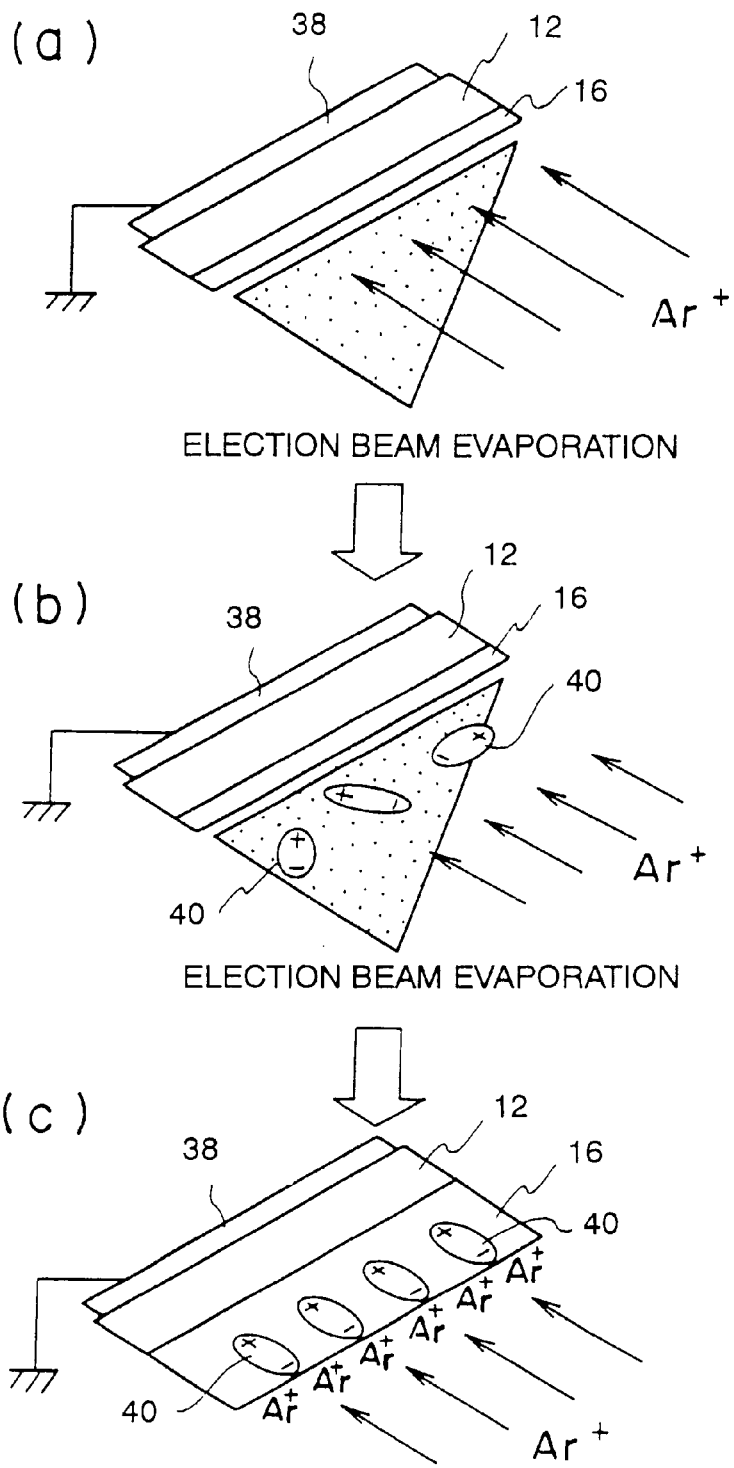
FIGS. 21(a,b,c) is a diagram showing another embodiment of the method for manufacturing a nonlinear optical thin film according to the present invention.

FIGS. 21(a) to 21(c) show the steps of the manufacturing method of a nonlinear optical thin film according to a second embodiment.

In FIG. 21(a), a $SiO_2$—$GeO_2$-system thin film 16 is deposited on the surface of a substrate 12 by electron beam evaporation by irradiating an electron beam to a $SiO_2$—$GeO_2$-system glass charged in a hearth liner, not shown.

heated to about 300° C., for example, the dipoles can be formed more efficiently.

When a $SiO_2$—$GeO_2$-system thin film 16 has been formed as described, as shown in FIG. 21(b), the dipoles 40 produced are directed in random directions. Therefore, under this condition, the $SiO_2$—$GeO_2$-system thin film is unable to exhibit nonlinear characteristics. So, as shown in FIG. 21(c), after the $SiO_2$—$GeO_2$-system thin film 16 has grown to a certain degree of a final thickness, the injected energy of argon ions for ion beam assist is lowered to 100 eV to 500 eV or so. By executing the orientation process by ion beam assist with argon ions at a lower energy than in ion beam assist for the film deposition process in FIG. 21(a), argon ions can be accumulated on the surface of the $SiO_2$—$GeO_2$-system thin film 16. Meanwhile, the substrate 12 has formed on the reverse side thereof a lower electrode 38, which is grounded. Therefore, an electric field is produced between the argon ions (positive ions) accumulated on the $SiO_2$—$GeO_2$-system thin film 16 and the lower electrode 38, and by this electric field, the dipoles 40 in the $SiO_2$—$GeO_2$-system thin film 16 are oriented in a fixed direction. Thus, the $SiO_2$—$GeO_2$-system thin film 16 is provided with nonlinearity.

As mentioned above, when the $SiO_2$—$GeO_2$-system thin film 16 is formed on the surface of the substrate 12, by changing the injected energy of argon ions for ion beam assist, dipoles as the origins of nonlinearity can be formed and oriented, thus obviating the need to perform an additional poling process after the $SiO_2$—$GeO_2$-system thin film 16 has been deposited.

By repeating the steps of FIGS. 21(a) to 21(c) a number of times, the $SiO_2$—$GeO_2$-system thin film 16 can be grown to a desired thickness.

In poling as the orientation process carried out heretofore, a molecular orientation process has been done using an electrode covering the whole surface of the $SiO_2$—$GeO_2$-system thin film 16, and therefore it has been impossible to control the orientation process so as to orient only those dipoles of a specific pattern in the direction of the film.

In contrast, according to the method for manufacturing a nonlinear optical thin film according to the second embodiment, by forming the lower electrode 38 in such a shape as a waveguide pattern, for example, only those dipoles 40 of a specific portion on the substrate 12 can be oriented, and in other words, the dipoles 40 can be easily oriented in a desired pattern. Thus, it becomes easy to produce a waveguide or similar devices.

Moreover, pattern control in the orientation process mentioned above can also be performed in such a way as scanning an argon ion beam for ion beam assist in a specified pattern on the deposited film. This method obviates the need of photolithography to form the lower electrode 38 in a specified pattern. In addition, each time the steps of FIGS. 21(*a*) to 21(*c*) are repeated, by changing the radiation pattern of argon ions, waveguides of different patterns can be produced. Therefore, it becomes easy to produce three-dimensional structures that have quadratic nonlinearity stacked in a number of layers.

After the $SiO_2$—$GeO_2$-system thin film 16 has been formed, by changing the injected energy of argon ions and utilizing the etching effect of ions, for example, it is possible to create fine structures, such as a periodic structure and an optical waveguide in a maskless process.

As has been described, according to the second embodiment, the formation and orientation of dipoles can be done in a series of processes by forming a $SiO_2$—$GeO_2$-system thin film while assisted by ion beam assist and controlling the injected energy of the ions.

What is claimed is:

1. A method for manufacturing a nonlinear optical thin film comprising the steps of:

forming a $SiO_2$—$GeO_2$-system thin film on a substrate by electron beam evaporation while performing ion beam assist to produce dipoles in the $SiO_2$—$GeO_2$ system thin film; and conducting poling by applying an electric field of 50 kV/cm to 200 kV/cm to the $SiO_2$—$GeO_2$ system thin film having dipoles therein, so as to orient the dipoles and thereby form the nonlinear optical thin film.

2. A method for manufacturing a nonlinear optical thin film comprising the steps of:

forming a $SiO_2$-$GeO_2$-system thin film on a substrate by electron beam evaporation while performing ion beam assist using any of argon, helium and neon ions to produce dipoles in the $SiO_2$-$GeO_2$-system thin film; and conducting poling by applying an electric field of 50-200 kV/cm to the $SiO_2$-$GeO_2$-system thin film having dipoles therein, so as to orient the dipoles and thereby form the nonlinear optical thin film.

3. A method for manufacturing a nonlinear optical thin film according to claim 2, wherein the poling is performed by applying the electric field simultaneously with the forming of the $SiO_2$—$GeO_2$ system thin film by said electron beam evaporation.

4. A method for manufacturing a nonlinear optical thin film according to claim 2, wherein an oxygen-deficient target is used in said electron beam evaporation.

5. A method for manufacturing a nonlinear optical thin film comprising the steps of:

forming a $SiO_2$—$GeO_2$-system thin film on a substrate by electron beam evaporation while performing ion beam assist to produce dipoles in the $SiO_2$—$GeO_2$ system thin film; and performing a molecular orientation process while performing ion beam assist at a lower energy than that used in said thin film forming step, so as to orient the dipoles and thereby form the nonlinear optical thin film.

\* \* \* \* \*